(12) United States Patent
Lee et al.

(10) Patent No.: US 12,449,837 B2
(45) Date of Patent: Oct. 21, 2025

(54) FOLDABLE DISPLAY APPARATUS

(71) Applicant: LG Display Co., Ltd., Seoul (KR)

(72) Inventors: Seonghyeon Lee, Busan (KR); Minwoo Jeon, Busan (KR); Jonggun Lee, Paju-si (KR); Suk Choi, Hwaseong-si (KR); Jungmin Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 592 days.

(21) Appl. No.: 17/834,730

(22) Filed: Jun. 7, 2022

(65) Prior Publication Data

US 2022/0390985 A1  Dec. 8, 2022

(30) Foreign Application Priority Data

Jun. 8, 2021 (KR) ........................ 10-2021-0074115

(51) Int. Cl.
| | |
|---|---|
| *G06F 1/16* | (2006.01) |
| *B32B 3/02* | (2006.01) |
| *B32B 7/022* | (2019.01) |
| *B32B 25/20* | (2006.01) |
| *B32B 27/38* | (2006.01) |
| *B32B 27/40* | (2006.01) |

(52) U.S. Cl.
CPC .............. *G06F 1/1616* (2013.01); *B32B 3/02* (2013.01); *B32B 7/022* (2019.01); *G06F 1/1656* (2013.01); *B32B 25/20* (2013.01); *B32B 27/38* (2013.01); *B32B 27/40* (2013.01); *B32B 2250/03* (2013.01); *B32B 2250/44* (2013.01); *B32B 2307/51* (2013.01); *B32B 2457/20* (2013.01); *Y10T 428/2457* (2015.01); *Y10T 428/24777* (2015.01)

(58) Field of Classification Search
CPC .... G06F 1/1616; G06F 1/1656; G06F 1/1652; B32B 3/02; B32B 7/022; B32B 25/20; B32B 27/38; B32B 27/40; B32B 2250/03; B32B 2250/44; B32B 2307/51; B32B 2457/20; Y10T 428/2457; Y10T 428/24777; G09F 9/301; H10K 50/865; H10K 50/84; H10K 77/111
See application file for complete search history.

(56) References Cited

U.S. PATENT DOCUMENTS

| | | | |
|---|---|---|---|
| 11,451,256 B1* | 9/2022 | Beaulieu | H04M 1/185 |
| 2018/0217639 A1* | 8/2018 | Jones | G06F 1/1652 |

(Continued)

FOREIGN PATENT DOCUMENTS

| | | |
|---|---|---|
| CN | 107867030 A | 4/2018 |
| CN | 107886847 A | 4/2018 |
| CN | 109940948 A | 6/2019 |

(Continued)

*Primary Examiner* — John D Freeman
(74) *Attorney, Agent, or Firm* — Seed Intellectual Property Law Group LLP

(57) ABSTRACT

A foldable display apparatus includes a display panel, a cover window on the display panel, and a first layer between the display panel and the cover window, the first layer having a storage modulus lower than a storage modulus of the cover window to reduce durability defects in the apparatus. The apparatus may further include a protective part between the display panel and the cover window for distributing stress and further reducing durability defects.

19 Claims, 15 Drawing Sheets

(56) References Cited

U.S. PATENT DOCUMENTS

2019/0143638 A1\* 5/2019 Park .................. H10K 59/8722
　　　　　　　　　　　　　　　　　　　　　　361/820
2019/0196249 A1\* 6/2019 Kim .................. G02F 1/133548

FOREIGN PATENT DOCUMENTS

| | | | |
|---|---|---|---|
| CN | 110277020 | A | 9/2019 |
| CN | 110853520 | A | 2/2020 |
| CN | 112310304 | A | 2/2021 |
| CN | 112397667 | A | 2/2021 |
| KR | 10-2018-0008204 | A | 1/2018 |
| KR | 20190052475 | A | 5/2019 |
| KR | 10-2020-0019025 | A | 2/2020 |
| KR | 10-2111138 | B1 | 5/2020 |
| KR | 20200070904 | A | 6/2020 |
| KR | 10-2203104 | B1 | 1/2021 |

\* cited by examiner (a)

(b)

(c)

(a)

(b)

(c)

(a)

(b)

FOLDABLE DISPLAY APPARATUS

CROSS-REFERENCE TO RELATED APPLICATION

This application claims the benefit of, and priority to, Korean Patent Application No. 10-2021-0074115 filed on Jun. 8, 2021 in the Korean Intellectual Property Office, the entire contents of which is hereby incorporated by reference.

BACKGROUND

Technical Field

The present disclosure relates to a foldable display apparatus. More specifically, the present disclosure relates to a foldable display apparatus in which durability defects may be reduced.

Description of the Related Art

As society advances toward an information-oriented society, various display apparatuses that process and display a large amount of information have been developed. There are various types of display apparatuses that display images, such as a liquid crystal display apparatus (LCD), an organic light-emitting display apparatus (OLED), and an electrophoretic display apparatus (EPD).

Users who watch broadcasts, videos, or play video games using the display apparatus tend to prefer a portable display apparatus having a large screen. However, when the screen of the portable display apparatus is enlarged, portability thereof is deteriorated. Thus, there is a limit to enlarge the screen thereof. In order to improve such portability, research on a foldable display apparatus in which a display panel is foldable is being actively conducted.

BRIEF SUMMARY

As folding and unfolding of conventional foldable display apparatus are repeated, durability defects such as peeling of an organic light-emitting layer in a display panel or cracks in a protective part disposed on the display panel can occur.

Accordingly, the present disclosure is generally directed to a foldable display apparatus in which folding durability defects may be reduced.

According to an embodiment of the present disclosure, a foldable display apparatus is provided in which durability defects such as peeling of the organic light-emitting layer or cracks in the protective part may be reduced.

To achieve these and other aspects of the concepts as embodied and broadly described herein, a foldable display apparatus generally includes a display panel, a cover window on the display panel, and a first layer between the display panel and the cover window, the first layer having a storage modulus lower than a storage modulus of the cover window. The storage modulus may be an elastic storage modulus in some embodiments, defined as the ratio of elastic stress to strain.

In another aspect, a foldable display apparatus includes a first layer between a display panel and a cover window, and the first layer has a storage modulus lower than that of the cover window. Moreover, the foldable display apparatus may further include a protective part disposed between the display panel and the cover window, a first surface of the protective part includes a first recess overlapping a folding axis of the foldable area, and a second surface opposite to the first surface of the protective part includes at least two or more second recesses, the at least two or more second recesses are spaced apart from each other at both sides of the folding axis.

In another aspect, a foldable display apparatus includes a protective part between a display panel and a cover window, a first layer at a lower surface of the protective part, and a second layer at an upper surface of the protective part, a lower surface of the protective part includes a first recess overlapping the folding axis, and an upper surface of the protective part includes at least a pair of second recesses spaced apart from each other at both sides of the folding axis.

In another aspect, a foldable display apparatus comprises: a display panel including a display area, a non-display area at a periphery of the display area, and a foldable area overlapping a portion of the display area and a portion of the non-display area; a cover window on the display panel; a protective part between the display panel and the cover window; a first layer at a first surface of the protective part; and a second layer at a second surface opposite to the first surface of the protective part, wherein the first surface of the protective part includes a first recess overlapping a folding axis of the foldable area, and wherein the second surface of the protective part includes at least two or more second recesses, the at least two or more second recesses are spaced apart from each other at both sides of the folding axis.

In another aspect, a foldable display apparatus comprises: a display panel; a cover window on the display panel; a protective part between the display panel and the cover window; a light-blocking layer at a periphery portion of a bottom surface of the cover window; and a first layer formed at a lower surface of the cover window to cover the light-blocking layer, wherein the first layer is located above the protective part, and the first layer has a storage modulus lower than a storage modulus of the cover window.

According to an embodiment of the present disclosure, a first layer may be disposed between a display panel and a cover window, thereby obtaining the foldable display apparatus in which durability defects such as peeling of the organic light-emitting layer in the display panel may be reduced.

According to an embodiment of the present disclosure, a first recess overlapping a folding axis, and at least a pair of second recesses spaced apart from at both sides with respect to the folding axis are provided, thereby obtaining the foldable display apparatus in which durability defects such as cracks in the protective part may be reduced.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiments of the disclosure and together with the description serve to explain various principles of the disclosure.

Figure 1:
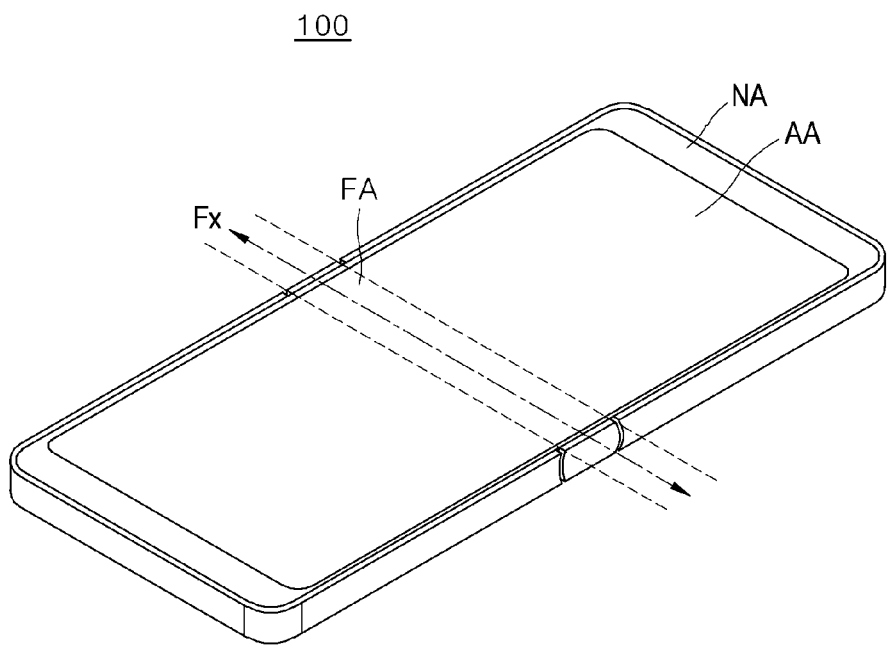
FIG. 1 is a perspective view illustrating a display apparatus according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

A shape, a size, a ratio, an angle, a number, etc., disclosed in the drawings for describing the embodiments of the present disclosure are exemplary, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is directed to the purpose of describing particular embodiments only and is not intended to be limiting of the present disclosure. As used herein, the singular constitutes "a" and "an" are intended to include the plural constitutes as well, unless the context clearly indicates otherwise. It will be further understood that the terms "comprise," "comprising," "include," and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list. In interpretation of numerical values, an error or tolerance therein may occur even when there is no explicit description thereof.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to," or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

In descriptions of temporal relationships, for example, temporal precedent relationships between two events such as "after," "subsequent to," "before," etc., another event may occur therebetween unless "directly after," "directly subsequent" or "directly before" is indicated.

It will be understood that, although the terms "first," "second," "third," and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

As used herein, the term "substantially," "about," and similar terms are used as terms of approximation, and are intended to account for inherent deviations in measured or calculated values that would be recognized by those of ordinary skill in the art. The term may be used to prevent unauthorized exploitation by an unauthorized infringer to design around accurate or absolute figures provided to help understand the present disclosure. Unless the context dictates otherwise, relative terms such as "substantially" and "about" are construed as being within 5% of the stated value.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in detail with reference to the accompanying drawings. For convenience of description, a scale of each of elements illustrated in the accompanying drawings differs from a real scale, and thus, is not limited to a scale illustrated in the drawings.

FIG. 1 is a perspective view illustrating a foldable display apparatus according to an embodiment of the present disclosure.

Referring to FIG. 1, a foldable display apparatus 100 according to an embodiment of the present disclosure may include a display area AA, a non-display area NA, and a foldable area FA. The display area AA may be an area in which an image is displayed. The non-display area NA is located at a periphery of the display area AA, and may be an area in which no image is displayed. The foldable area FA is disposed at and around a folding axis Fx and may be an area overlapping a portion of the display area AA and a portion of the non-display area NA. For example, the foldable area FA may be bent at a predetermined curvature when the foldable display apparatus 100 is folded in an in-folding or out-folding manner. In the in-folding manner, the foldable display apparatus 100 is bent about the folding axis Fx to bring the top surface of the apparatus 100 on one side of the folding axis Fx toward the top surface of the apparatus 100 on the other side of the folding axis Fx. In the out-folding manner, the process is the opposite, namely the bottom surface 100 of the apparatus on one side of the folding axis Fx is brought toward the bottom surface of the apparatus 100 on the other side of the folding axis Fx. An area of the display area AA and the non-display area NA other than the foldable area FA may be a non-foldable area of the foldable display apparatus 100. Moreover, the foldable display apparatus 100 may further include a case configured to support and accommodate the display panel and a hinge structure configured to fold the display panel.

Figure 2:
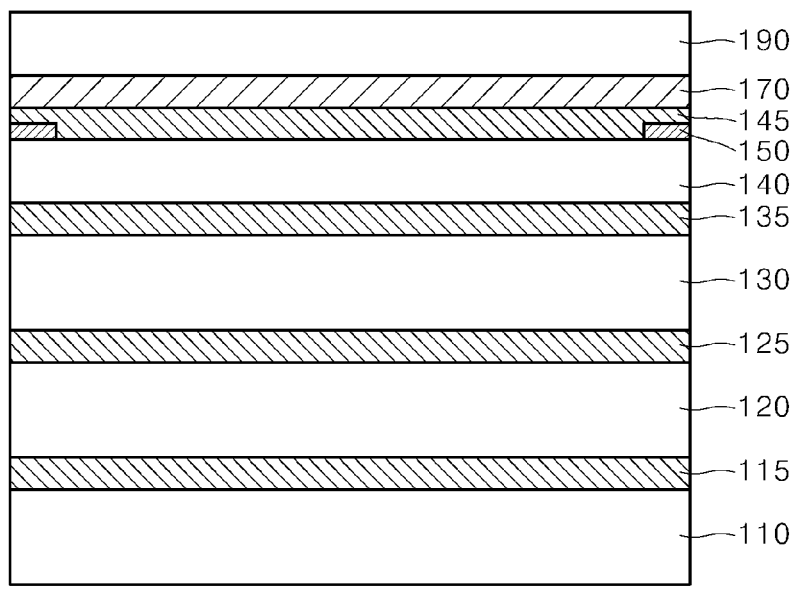
FIG. 2 to FIG. 4 are cross-sectional views illustrating display apparatuses according to embodiments of the present disclosure.

FIG. 2 is a cross-sectional view illustrating a foldable display apparatus according to an embodiment of the present disclosure.

Referring to FIG. 2, the foldable display apparatus 100 according to an embodiment of the present disclosure may include a display panel 120, a support structure 110, a polarizing plate 130, a protective base 140, a light-blocking layer (or a light-shielding layer) 150, a first layer 170, and a cover window 190 disposed on each other or otherwise coupled to each other in a stack.

The display panel 120 may display an image. The display panel 120 may be flexible and may display an image to a user. For example, the display panel 120 may be embodied as an organic light-emitting display panel. Embodiments of the present disclosure are not limited thereto. The display panel 120 may have various types, for example, a liquid crystal display panel, an electrophoretic display panel, and the like. When the display panel 120 is embodied as an organic light-emitting display panel, the display panel 120 may include a substrate, a thin-film transistor array having thin-film transistors (including a switching thin-film transistor and a driving thin-film transistor) for each pixel on a substrate, an organic light-emitting layer having an organic light-emitting element connected to the driving thin-film transistor for each pixel, and an encapsulation layer that covers the organic light-emitting layer to prevent penetration of moisture and oxygen from an outside into the organic light-emitting layer. The display panel may further include a touch electrode array on the encapsulation layer.

The support structure 110 may be configured to support the display panel 120. The support structure 110 may be a single support layer or may include at more than one support with the support layers formed on, or adhered to, each other. The support layer may be attached to the display panel 120 using an adhesive layer. The support layer has greater stiffness than that of the display panel 120. For example, the support layer may be formed of a metal material such as stainless steel (SUS) or may be formed of polymer such as polymethylmethacrylate (PMMA), polycarbonate (PC), polyacrylate (PA), polyvinylalcohol (PVA), acrylonitrile-butadiene-styrene (ABS), or polyethylene terephthalate (PET). Embodiments of the present disclosure are not limited thereto. The support structure 110 may have a structure in which at least one or more support layers are bonded or attached to each other by an adhesive layer. When the display apparatus according to an embodiment of the present disclosure is embodied as a foldable display apparatus, a plurality of folding patterns may be formed in at least one or more of the support layers among the support layers and in a discontinuous form and in an area corresponding to the foldable area. The folding patterns may include holes or slits passing through the support layers. Embodiments of the present disclosure are not limited thereto.

The polarizing plate 130 may be configured to secure visibility of the display panel 120. For example, the polarizing plate 130 may include a polarizer and a retardation film disposed on one surface of the polarizer.

The light-blocking layer 150 may be configured to conceal a periphery portion of the display panel 120, for example, a driving circuit, various wirings, and a pad in the non-display area NA from the user. In an embodiment, the light-blocking layer 150 may be disposed on a periphery portion of one surface of the protective base 140. In one or more embodiments, the light-blocking layer 150 is disposed on a portion of the protective base 140 along the outer periphery of one surface of the protective base 140, such as the outer periphery of a top or bottom surface of the protective base 140. The protective base 140 may include a flexible polymer film such as polyimide (PI), polyethylene terephthalate (PET), propylene glycol (PPG), and polycarbonate (PC). Embodiments of the present disclosure are not limited thereto. The light-blocking layer 150 may be disposed in the non-display area NA. The light-blocking layer 150 may be formed on a periphery portion of one surface of the protective base 140. The light-blocking layer 150 may be formed in a ring shape around the outer edge of the protective base 140. For example, the light-blocking layer 150 may be formed by printing black ink using a printing method. Embodiments of the present disclosure are not limited thereto.

The cover window 190 may include a polymer film. For example, the polymer film may be transparent. The polymer film may include polyethylene terephthalate (PET), colorless polyimide (PI), or a stack of polyethylene terephthalate (PET) and colorless polyimide (PI). The cover window 190 may further include a hard coating layer formed on the transparent polymer film. For example, the hard coating layer may be transparent.

In conventional foldable display devices, the organic light-emitting layer of the display panel may be peeled off due to a compressive stress being repeatedly applied to an upper portion of the display panel during repeated folding and unfolding of the foldable display device.

According to an embodiment of the present disclosure, the first layer 170 may be configured to reduce the stress applied to the display panel 120 and overcome the disadvantages of known foldable display devices. The first layer 170 may be formed at a lower surface of the cover window 190 or may be adhered to the lower surface of the cover window 190 by an adhesive layer. For example, the first layer 170 may be coated directly on the lower surface of the cover window 190. In an embodiment, the first layer 170 is coupled to the cover window 190 with an optically transparent adhesive layer. To reduce the compressive stress applied to the upper portion of the display panel 120 during a folding of the apparatus, the first layer 170 may have a storage modulus that is less than a storage modulus of the cover window 190. The storage modulus may refer to an amount of elastic energy accumulated in a vibrating sample and may be a dynamic modulus. The storage modulus may also refer to an elastic storage modulus, defined as the ratio of elastic stress to strain. In an embodiment, the first layer 170 may include a polymer material having a storage modulus in a range from $1\times10^7$ to $9\times10^8$ Pa. Although the storage modulus of the first layer 170 can be selected to be greater than the storage modulus of the cover window 190, it has been found that when the storage modulus of the first layer 170 is equal to or greater than the storage modulus of the cover window 190 (i.e., the storage modulus of the first layer 170 is greater than or equal to $1\times10^9$ Pa), the compressive stress applied to the cover window 190 increases, and particularly to the hard coating layer of the cover window 190. As a result, cracks may occur in the cover window 190, and particularly in the hard coating layer of the cover window 190. Accordingly, the first layer 170 has a storage modulus less than the storage modulus of the cover window 190 in a preferred embodiment to reducing cracking in the cover window 190 and the hard coating layer of the cover window 190. In some embodiments, the first layer 170 may have a storage modulus greater than the cover window 190, and the foldable display apparatus 100 includes additional layers or structures, such as a second layer with a storage modulus less than the cover window 190, to reduce the compressive stress on the cover window 190 and reduce cracking.

Moreover, it has further been discovered that the organic light-emitting layer in the display panel 120 may be peeled off or otherwise separate from the surrounding layers due to an increase in the compressive stress, such as when the storage modulus of the first layer 170 is greater than the storage modulus of the cover window 190. Thus, the first layer 170 has a storage modulus less than the cover window 190 in a preferred embodiment for at least this additional reason. In an embodiment, the polymer material that may be included in the first layer 170 may have a Poisson's ratio in a range of 0.38 to 0.43. Although the Poisson's ratio of the polymer material that may be included in the first layer 170 can be selected to be lower than 0.38, it has been found that such a Poisson's ratio results in an increase in the compressive stress applied to the hard coating layer of the cover window 190, which may result in cracks in the hard coating layer of the cover window 190. Accordingly, the Poisson's ratio of the first layer 170 is greater than 0.38 in a preferred embodiment. In some embodiments, the first layer 170 may be selected to have a Poisson's ratio less than 0.38 and the foldable display apparatus 100 includes additional layers, such as a layer with a Poisson's ratio greater than 0.38, to reduce the compressive stress on the cover window 190. The first layer 170 may include, for example, a silicone-based, a urethane-based, an epoxy-based, or an acrylic-based polymer. For example, the first layer may be a stress reducing layer or a buffer layer. Embodiments of the present disclosure are not limited thereto.

A thickness of the first layer 170 may be from 30 to 100 µm. It has also been found that when the thickness of the first layer 170 is smaller than 30 µm, the effect of reducing the compressive stress applied to the upper portion of the display panel 120 during the folding of the apparatus is small or insignificant, so that the light-emitting layer or the organic light-emitting layer in the display panel 120 may be peeled off, and an improvement effect of a puncture strength may be small or insignificant. A display apparatus to which the first layer 170 is not applied has the puncture strength of 4.0 kgF. When the thickness of the first layer 170 is greater than 100 µm, the compressive stress applied to the hard coating layer of the cover window 190 may increase such that the cracks may occur in the hard coating layer of the cover window 190. Thus, the thickness of the first layer 170 is between approximately 30 to 100 µm in a preferred embodiment. The thickness may be selected to be more or less than this range, particularly where other structures of the display apparatus 100 help reduce compressive stress on the cover window 190.

Further, the display apparatus 100 according to an embodiment of the present disclosure may include at least one or more adhesive layers. For example, the at least one or more adhesive layers may include a first adhesive layer 115, a second adhesive layer 125, a third adhesive layer 135, and a fourth adhesive layer 145. The first adhesive layer 115 may adhere the support structure 110 and the display panel 120 to each other. The second adhesive layer 125 may adhere the display panel 120 and the polarizing plate 130 to each other. The third adhesive layer 135 may adhere the polarizing plate 130 and the protective base 140 to each other. The fourth adhesive layer 145 may adhere the protective base 140 and the first layer 170 to each other. Each of the first to fourth adhesive layers 115 to 145 may include an optically clear adhesive (OCA). Embodiments of the present disclosure are not limited thereto.

According to an embodiment of the present disclosure, the first layer 170 is disposed at a lower surface of the cover window 190 and above the display panel 120, thereby reducing the compressive stress applied to the upper portion of the display panel 120 during the folding of the apparatus 100. The reduction in compressive stress to the upper portion of the display panel 120 in the foldable display apparatus 100 according to an embodiment of the present disclosure may reduce the likelihood that the organic light-emitting layer in the display panel 120 is peeled off or otherwise separated over repeated folding and unfolding cycles of the apparatus 100. Further, the inclusion of the first layer 170 and its location in the apparatus 100 provide the additional benefit of increasing the puncture strength of the foldable display apparatus 100. For example, due to the configuration of the first layer 170, the puncture strength of the display apparatus 100 may be in the range of 6.0 kgF to 7.0 kgF. As noted above, the puncture strength of the display apparatus 100 without the first layer 170 may be 4.0 kgF, such that the first layer 170 provides a significant increase in the puncture strength of the apparatus 100 and therefore improves overall durability of the apparatus 100.

Figure 3:
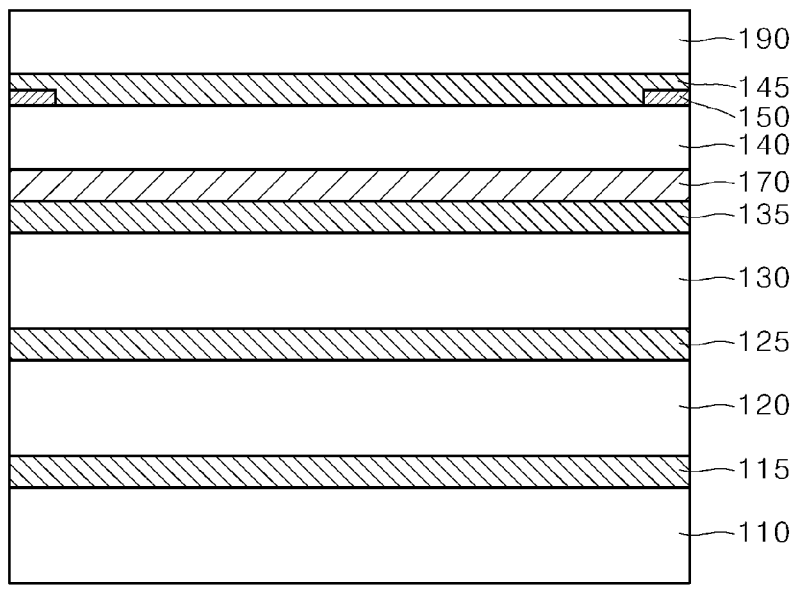

FIG. 3 is a cross-sectional view illustrating a foldable display apparatus 100-1 according to an embodiment of the present disclosure.

Referring to FIG. 3, the foldable display apparatus 100-1 according to an embodiment of the present disclosure may include the first layer 170 disposed at a lower surface of the protective base 140. In an embodiment of the present disclosure, components of the apparatus 100-1 other than the first layer 170 may be substantially the same as those of the apparatus 100 in FIG. 2. Thus, a repetitive description thereof may be omitted.

The first layer 170 may be formed at the lower surface of the protective base 140 or adhered thereto by an adhesive layer. For example, the first layer 170 may be coated directly on the lower surface of the protective base 140. In some embodiments, the first layer 170 is coupled to the lower surface of the protective base 140 by an optically transparent adhesive layer.

Disposing the first layer 170 at the lower surface of the protective base 140 reduces the compressive stress applied to the upper portion of the display panel 120 during the folding of the apparatus. Therefore, the foldable display apparatus 100-1 according to an embodiment of the present disclosure may reduce the defect that the organic light-emitting layer in the display panel 120 is peeled off even when the folding and unfolding of the apparatus are repeated, as described above for apparatus 100. Further, the effect of increasing the puncture strength of the foldable display apparatus 100-1 due to the configuration of the first layer 170 may be obtained. For example, due to the configuration of the first layer 170, the puncture strength of the display apparatus may have a puncture strength of 6.0 kgF to 7.0 kgF.

Figure 4:
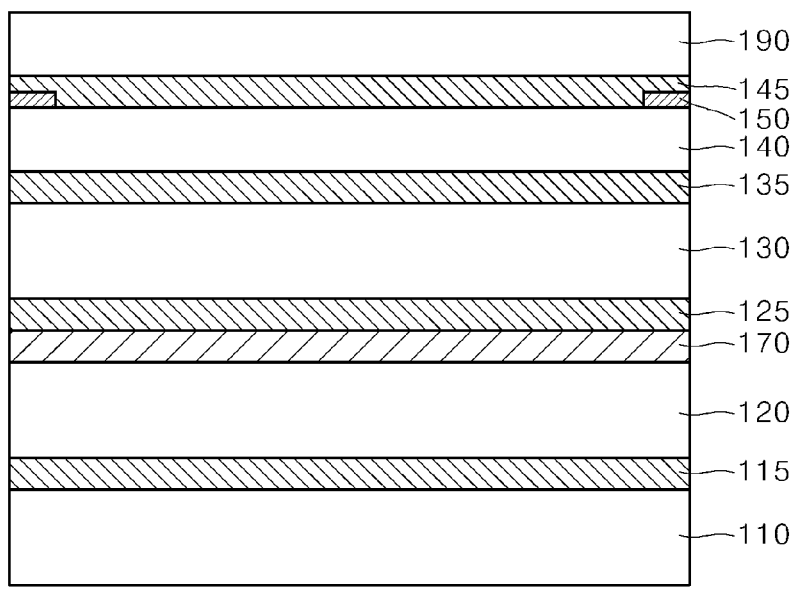

FIG. 4 is a cross-sectional view illustrating a foldable display apparatus according to an embodiment of the present disclosure.

Referring to FIG. 4, a foldable display apparatus 100-2 according to an embodiment of the present disclosure may include the first layer 170 disposed on an upper surface of the display panel 120. In this embodiment, the components of the apparatus 100-2 other than the first layer 170 are the same as those of the embodiment of the apparatus 100 in FIG. 2. Thus, a repetitive description thereof is omitted.

The first layer 170 may be formed on the upper surface of the display panel 120 or adhered thereto via an adhesive layer. For example, the first layer 170 may be coated directly on the upper surface of the display panel 120 or coupled to the upper surface of the display panel 120 by an optically transparent adhesive layer.

The first layer 170 being disposed on the upper surface of the display panel 120 reduces the compressive stress applied to the top of the display panel 120 during the folding of the apparatus 100-2. Therefore, the foldable display apparatus 100-2 according to an embodiment of the present disclosure may reduce the defect that the organic light-emitting layer in the display panel 120 is peeled off even when the folding and unfolding of the apparatus are repeated. Further, the effect of increasing the puncture strength of the foldable display apparatus 100-2 due to the addition of the first layer 170 may be obtained. As is clear from the above description with respect to FIGS. 2-4, the first layer 170 may be selected to be positioned in multiple different locations in the apparatus 100, such as directly on the cover window 190, in an intermediate layer between the cover window 190 and the display panel 120, or directly on the display panel 120, among other possible locations, and still achieve the benefits described herein, namely to reduce defects in the display panel 120 and the cover window 190.

Figure 5:
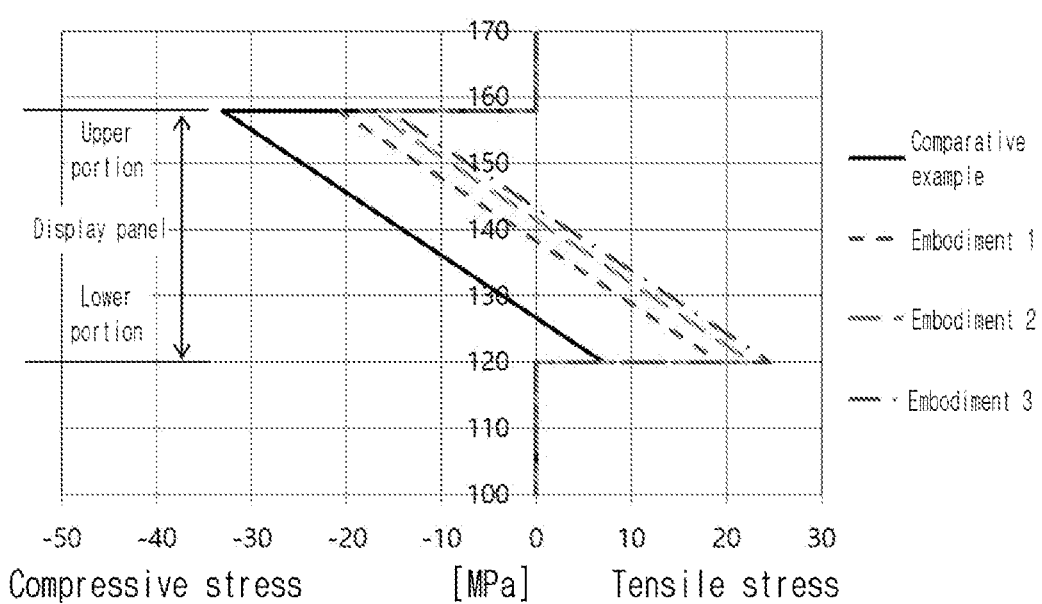
FIG. 5 is a graphical representation of simulation results of stress distributions of display panels in display apparatuses according to embodiments of the present disclosure.

FIG. 5 is a graphical representation of simulation results of stresses applied to display panels in foldable display apparatuses according to embodiments of the present disclosure.

In FIG. 5, the comparative example is a foldable display apparatus without the first layer, embodiment 1 is a foldable display apparatus 100 illustrated in FIG. 2, embodiment 2 is a foldable display apparatus 100-1 illustrated in FIG. 3, and embodiment 3 is a foldable display apparatus 100-2 illustrated in FIG. 4.

Referring to FIG. 5, it may be identified that a relatively high compressive stress is applied to the upper portion of the display panel during in-folding of the apparatus. Due to the compressive stress, peeling of the organic light-emitting layer may occur in the comparative example when evaluating the folding durability via repeatedly performing folding and unfolding of the foldable display apparatus. However, it may be identified that in the embodiments 1 to 3, the compressive stress applied to the upper portion of the display panel is significantly reduced, compared to the comparative example. In the comparative example, the compressive stress applied to the upper portion of the display panel may be about −33 MPa. In embodiment 1, the compressive stress applied to the upper portion of the display panel may be about −21 MPa. In embodiment 2, the compressive stress applied to the upper portion of the display panel may be about −17.4 MPa. In embodiment 3, the compressive stress applied to the upper portion of the display panel may be about −15.5 MPa.

According to the simulation results, it may be identified that when the first layer is disposed between the cover window and the display panel, the compressive stress applied to the upper portion of the display panel during the folding of the apparatus, for example, in-folding of the apparatus is reduced. For example, the inclusion of the first layer 170 reduces compressive stress by at least 12 MPa regardless of the position of the first layer 170. Further, according to the simulation results, it may be identified that there is a direct relationship between the position of the first layer 170 and the compressive stress on the display panel. More specifically, as the first layer is positioned closer to the display panel, the compressive stress applied to the upper portion of the display panel decreases. The simulation result may correspond to a folding durability evaluation result. Thus, a peeling-off of the organic light-emitting layer may be reduced or prevented in evaluating the folding durability of the apparatus.

Figure 6:
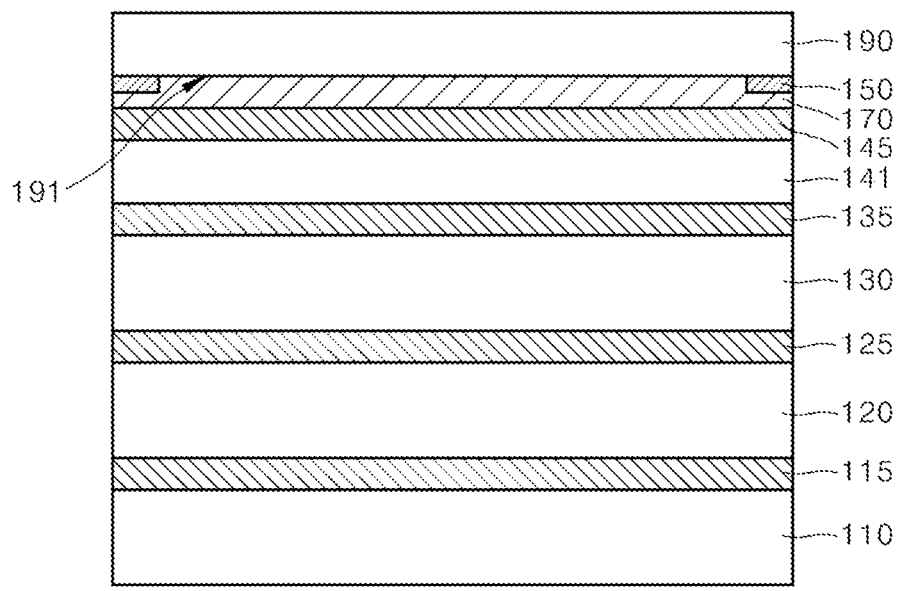
FIG. 6 to FIG. 8 are cross-sectional views illustrating display apparatuses according to embodiments of the present disclosure.
Figure 7:
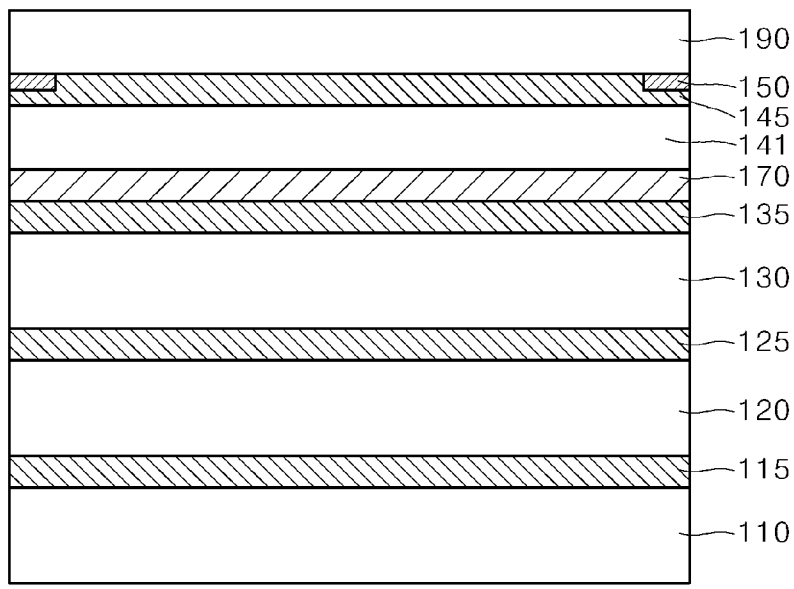
Figure 8:
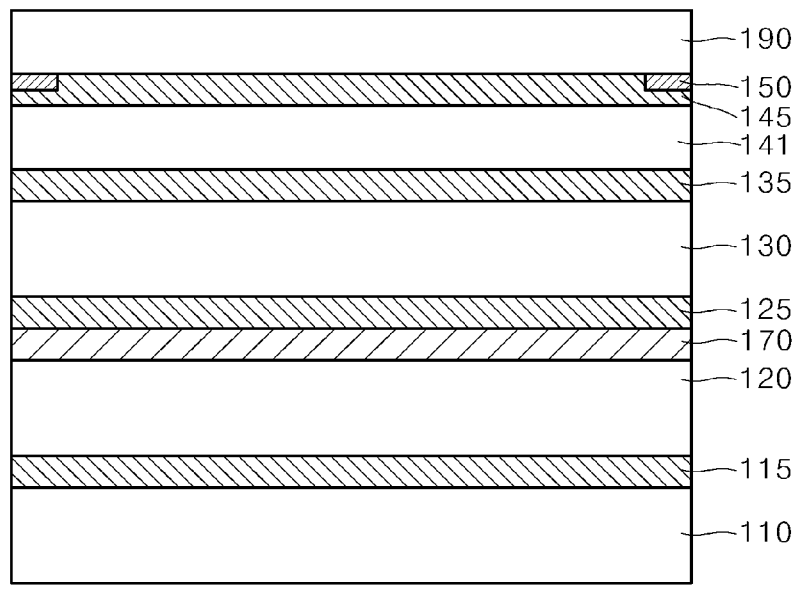

FIG. 6 to FIG. 8 are cross-sectional views illustrating foldable display apparatuses according to embodiments of the present disclosure.

Referring to FIG. 6, a foldable display apparatus 100-3 according to an embodiment of the present disclosure includes a protective part 141 instead of the protective base 140, and may include a light-blocking layer 150 at a portion of a periphery of a bottom surface 191 of the cover window 190. The first layer 170 may be formed at a lower surface of the cover window 190 to cover the light-blocking layer 150. For example, the first layer 170 may be coated directly on the lower surface of the cover window 190 to cover the light-blocking layer 150.

In an embodiment of the present disclosure, the components of the foldable display apparatus 100-3 other than the protective part 141 and the light-blocking layer 150 may be substantially the same as those of the embodiment in FIG. 2, and thus a repetitive description thereof may be omitted. The protective part 141 may be made of glass. For example, the protective part 141 may be embodied as a protective window, a protective glass, or a cover glass. As shown in FIG. 6, the first layer 170 may locate above the protective part 141. Embodiments of the present disclosure are not limited thereto.

To provide advantageous strength characteristics and folding characteristics, the protective part 141 may have a thickness of 30 to 200 μm. In an embodiment, the protective part 141 may have a uniform thickness over an entire area thereof.

Referring to FIG. 7, a foldable display apparatus 100-4 according to an embodiment of the present disclosure may include the first layer 170 disposed at a lower surface of the protective part 141. The light-blocking layer 150 is formed at the periphery portion of the lower surface of the cover window 190 and may be covered with the fourth adhesive layer 145 for bonding or attaching the cover window 190 and the protective part 141 to each other.

Referring to FIG. 8, a foldable display apparatus 100-5 according to an embodiment of the present disclosure may include the first layer 170 disposed at an upper surface of the display panel 120 and the protective part 141 replacing the protective base 140. The first layer 170 may be formed at the upper surface of the display panel 120 or adhered thereto by an adhesive layer. For example, the first layer 170 may be coated directly on the upper surface of the display panel 120. In an embodiment, the first layer 170 is coupled to the upper surface of the display panel 120 with an optically transparent adhesive layer.

In an embodiment, the first layer 170 is provided between the cover window 190 and the display panel 120, and more specifically, the first layer 170 is disposed on the lower surface of the cover window 190 as illustrated in the embodiment of FIG. 6. In an embodiment, the first layer 170 is disposed on the lower surface of the protective part 141 as illustrated in the embodiment of FIG. 7. In yet a further embodiment, the first layer 170 is disposed on the upper surface of the display panel 120 as illustrated in an embodiment in FIG. 8. In the above embodiments, the compressive stress applied to the upper portion of the display panel 120 is reduced during the folding of the apparatus. Therefore, each of the foldable display apparatuses 100-3, 100-4, and 100-5 according to embodiments of the present disclosure may reduce the defect that the organic light-emitting layer in the display panel 120 is peeled off even when the folding and unfolding of the apparatus are repeated, in addition to the other benefits described herein.

Figure 9:
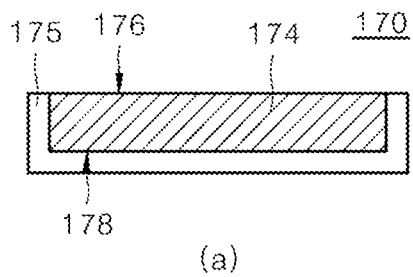
FIG. 9 and FIG. 10 illustrate first layers according to embodiments of the present disclosure.
Figure 9:
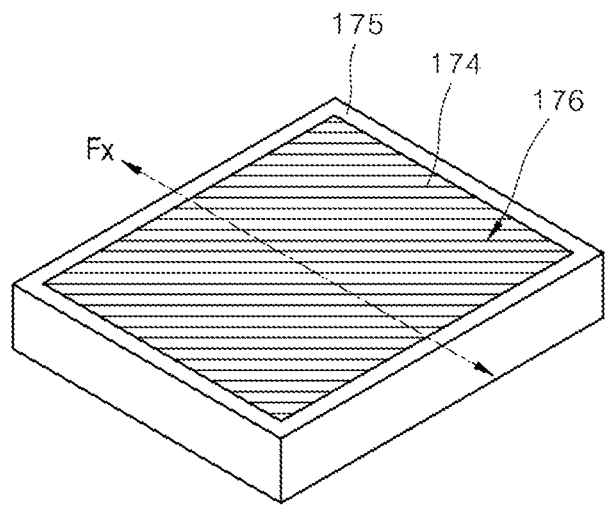
Figure 9:
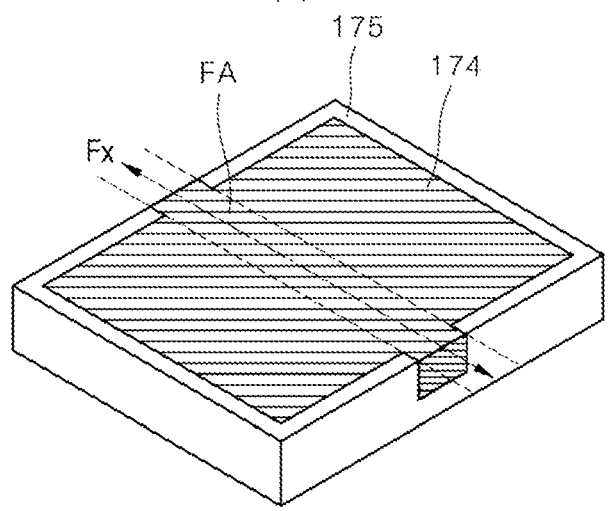
Figure 10:
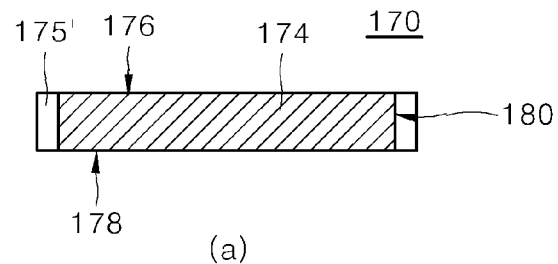
Figure 10:
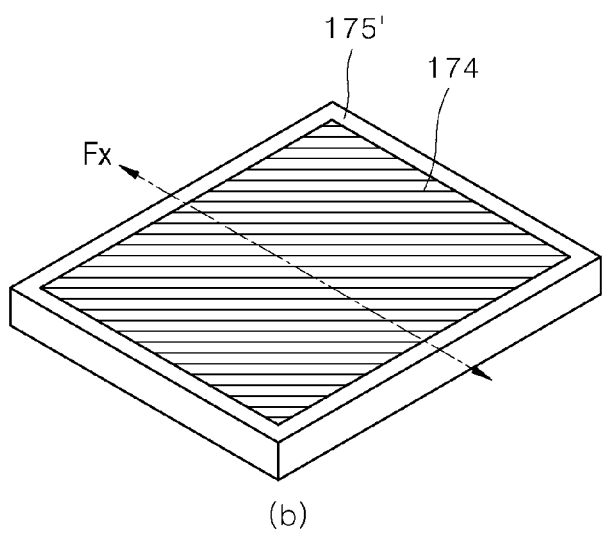
Figure 10:
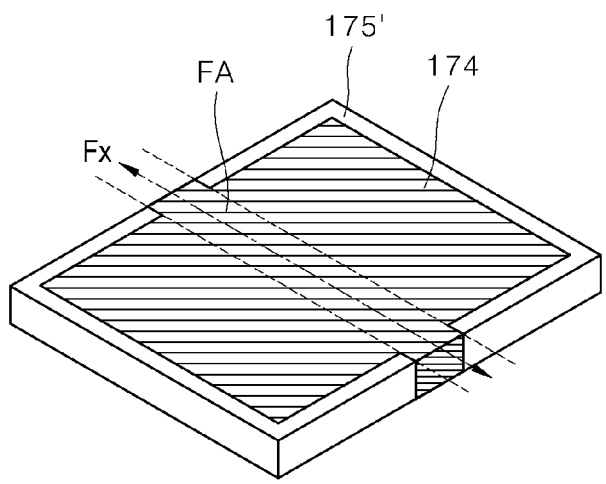

FIG. 9 and FIG. 10 illustrate the first layer 170 according to embodiments of the present disclosure. In particular, drawing (a) of FIG. 9 and drawing (a) of FIG. 10 are cross-sectional views of the first layer 170, and drawings (b) and (c) of FIG. 9, and drawings (b) and (c) of FIG. 10 are perspective views of the first layer 170.

Referring to FIG. 9 and FIG. 10, the first layer 170 may include a core layer 174 and a protective layer 175 surrounding at least a portion of, or all of, side surfaces of the core layer 174. The core layer 174 may include a polymer.

When the core layer 174 is formed of, for example, a thermoplastic polyurethane (TPU) polymer, the protective layer 175 formed of silicon oxide, silicon nitride or silicon oxynitride may surround the core layer 174 to improve the moisture resistance and heat resistance of the thermoplastic polyurethane polymer. Depending on a formation method of the protective layer 175, the protective layer 175 may cover a lower surface or an upper surface of the core layer 174, as illustrated in FIG. 9, or a protective layer 175' may not cover the lower surface or the upper surface of the core layer 174, as illustrated in FIG. 10. In particular, the core layer 174 may have a first or upper surface 176 and a second or lower surface 178 opposite to the first surface 176 with side surfaces 180 extending between the first and second surfaces 176, 178. As shown in (a) of FIG. 9, the protective layer 175 is on the second surface 178 of the core layer 174 as well as on each of the side surfaces 180 of the core layer 174. In an embodiment, the protective layer 175 may be on the first surface 176 as well as the side surfaces 180. In yet a further embodiment, the protective layer 175 is on both the first and second surfaces 176, 178 as well as the side surfaces 180. In (a) of FIG. 10, the protective layer 175' is only on the side surfaces 180 and is absent from the first and second surfaces 176, 178.

As illustrated in (c) of FIG. 9 and (c) of FIG. 10, each of the protective layers 175 and 175' may not be disposed in a folding area FA adjacent to the folding axis Fx among the side surfaces 180 of the core layer 174. In other words, and as shown in (c) of FIG. 9 and (c) of FIG. 10, the protective layers 175, 175' may be absent from a portion of the side surfaces 180 adjacent to either side of the folding axis Fx and generally corresponding to the folding area FA. It has been discovered that when the protective layers 175 and 175' are formed of inorganic material and disposed at the foldable area FA, the protective layers 175, 175' may be unfavorable to folding and cracks may occur during the folding of the apparatus. Thus, while it is contemplated to include the protective layers 175, 175' on the side surfaces 180 adjacent to the folding axis Fx, each of the protective layers 175 and 175' are omitted from the side surfaces 180 in an area adjacent to the folding axis Fx (i.e., omitted in the foldable area FA) in a preferred embodiment to reduce the occurrence of cracks during the folding of the apparatus.

Figure 11:
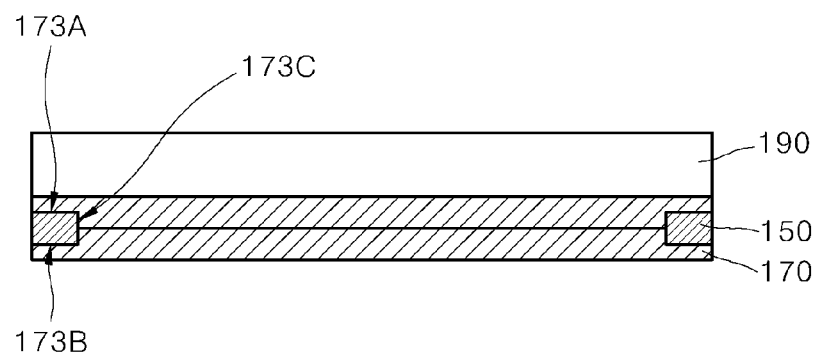
FIG. 11 and FIG. 12 respectively illustrate a first layer covering a light-blocking layer and steps in an embodiment of a manufacturing method thereof according to the present disclosure.
Figure 12:
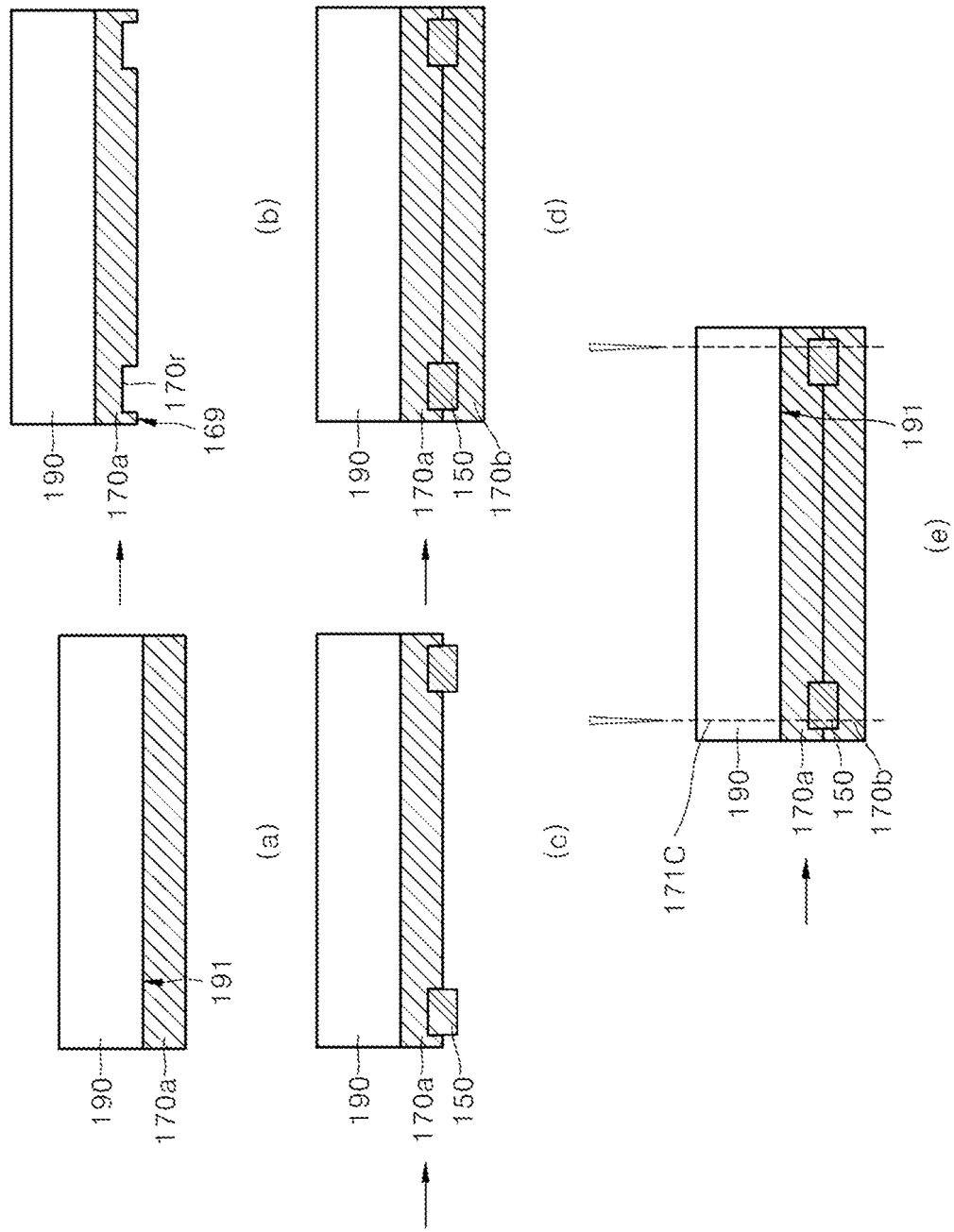

FIG. 11 and FIG. 12 illustrate the first layer covering the light-blocking layer according to an embodiment of the present disclosure and an embodiment of a manufacturing method thereof, respectively.

Referring to FIG. 11, the first layer 170 is disposed at the lower surface of the cover window 190 and may cover an upper surface 173A, an inner surface 173B and a lower surface 173C of the light-blocking layer 150. The upper surface 173A, inner surface 173B, and lower surface 173C of the light-blocking layer 150 correspond to the non-display area NA of the display panel 120 (FIG. 2) and the non-display area NA (FIG. 1) of the apparatus 100 generally. For example, the light-blocking layer 150 may be disposed at a periphery portion of the display panel 120, or a portion of a periphery or outer edge of the display panel 120. The first layer 170 may be formed of a shape memory polymer. For example, the first layer 170 may be formed of a polyurethane shape memory polymer or a silicone elastomer shape memory polymer.

FIG. 12 generally illustrates steps in an embodiment of a manufacturing process for the first layer 170 according to the present disclosure in images (a)-(e). As will be explained in more detail below, the first layer 170 may be formed of two sublayers 170a, 170b to accommodate the light-blocking layer 150 at least partially internal to the first layer 170. Beginning with FIG. 12 (a), a first portion 170a (which may be also be referred to herein as a first sublayer 170a) of the first layer 170 is formed or coated at the lower surface 191 of the cover window 190. Then, referring to FIG. 12 (b), a groove 170r is formed in a portion of the first sublayer 170a adjacent to a periphery of the first sublayer 170a of the first layer 170. The groove 170r may be positioned at the periphery of the first sublayer 170a or may be spaced from the periphery of the first sublayer 170a by a ridge 169. Then, referring to FIG. 12 (c), the light-blocking layer 150 is printed in the groove 170r. A thickness of the light-blocking layer 150 may be greater than a depth of the groove 170r such that the light-blocking layer 150 extends beyond an outer surface of the first sublayer 170a. Then, referring to FIG. 12 (d), a second portion 170b (which may also be referred to herein as a second sublayer 170b) of the first layer 170 is coated to cover the first sublayer 170a of the first layer 170 and the light-blocking layer 150. Turning to FIG. 12 (e), the periphery portion of the resulting structure including the cover window 190, the first sublayer 170a, the light-blocking layer 150, and the second sublayer 170b may be removed by a laser trimming along dashed lines 170c. Thus, the first layer 170 including the light-blocking layer as illustrated in FIG. 11 may be formed at the lower surface 191 of the cover window 190. Each of the first and second portions or sublayers 170a and 170b of the first layer 170 may be formed of a shape memory polymer. For example, each of the first and second portions or sublayers 170a and 170b of the first layer 170 may be formed of a polyurethane shape memory polymer or a silicone elastomer shape memory polymer.

Although an embodiment in which the light-blocking layer 150 and the first layer 170 are formed at the cover window 190 has been described above, the light-blocking layer 150 and the first layer 170 may be formed at the protective base 140 in the same form or scheme in another embodiment of the present disclosure. In one or more embodiments, the first layer 170 is formed separately and applied to the cover window 190, the protective base 140, or another structure with an adhesive layer. Still further, the light-blocking layer 150 can be injected or printed into a single layer to form the first layer 170 with the light-blocking layer 150 instead of the first layer 170 having multiple sublayers as described above.

Figure 13:
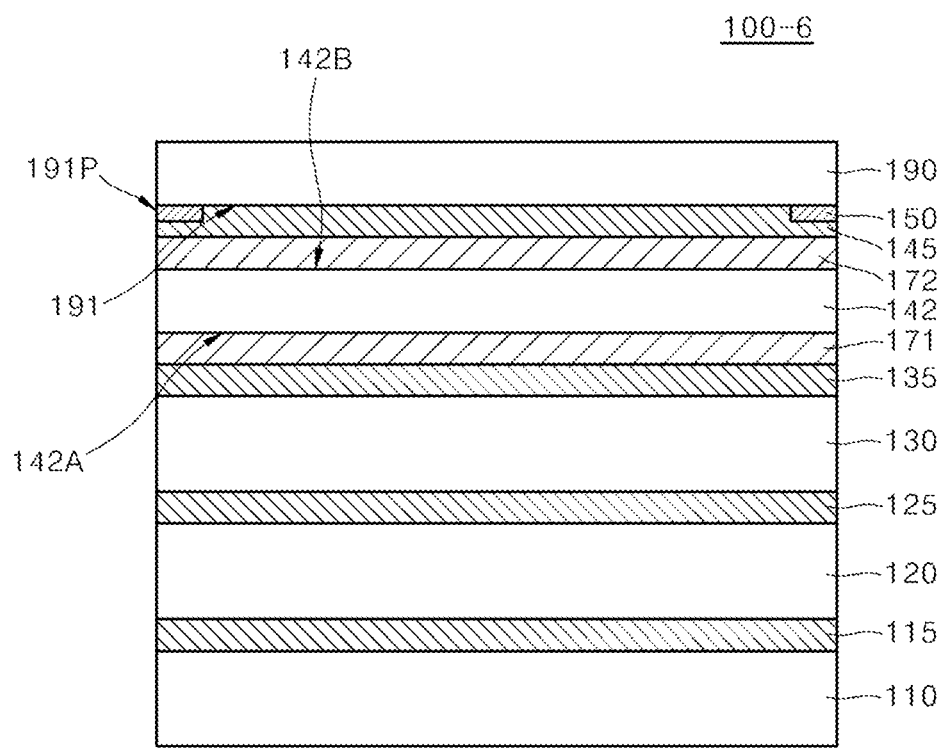
FIG. 13 is a cross-sectional view illustrating a foldable display apparatus according to an embodiment of the present disclosure.

FIG. 13 is a cross-sectional view illustrating a foldable display apparatus according to an embodiment of the present disclosure.

Referring to FIG. 13, a foldable display apparatus 100-6 according to an embodiment of the present disclosure may include a protective part 142 and the light blocking layer 150.

The light-blocking layer 150 may be disposed a periphery portion 191p of a lower 191 surface of the cover window 190. Moreover, the foldable display apparatus 100-6 may include a first layer 171 disposed at a first surface 142A of the protective part 142 and a second layer 172 disposed at a second surface 142B of the protective part 142. The first surface 142A of the protective part 142 may be, for example, a lower surface of the protective part 142, and the second surface 142B of the protective part 142 may be, for example, an upper surface of the protective part 142. In an embodiment of the present disclosure, the components other than the protective part 142, the first layer 171, the second layer 172, and the light-blocking layer 150 may be substantially the same as those of the apparatus 100 of FIG. 2. Thus, a repetitive description thereof is omitted. For example, the protective part 142 may be embodied as a protective window, a protective glass, or a cover glass. Embodiments of the present disclosure are not limited thereto. Further, the first layer 171 and the second layer 172 may be similar to the first layer 170 such that the apparatus 100-6 includes two layers for reducing compressive stress on the cover window 190 and the display panel 120. Accordingly, the concepts of the disclosure are not limited to only a single layer for reducing compressive stress, but rather, include more than one layer in selected locations in the apparatus 100-6 (i.e., the stress-reducing layers 171, 172 are in different layers of the apparatus 100-6).

Figure 14:
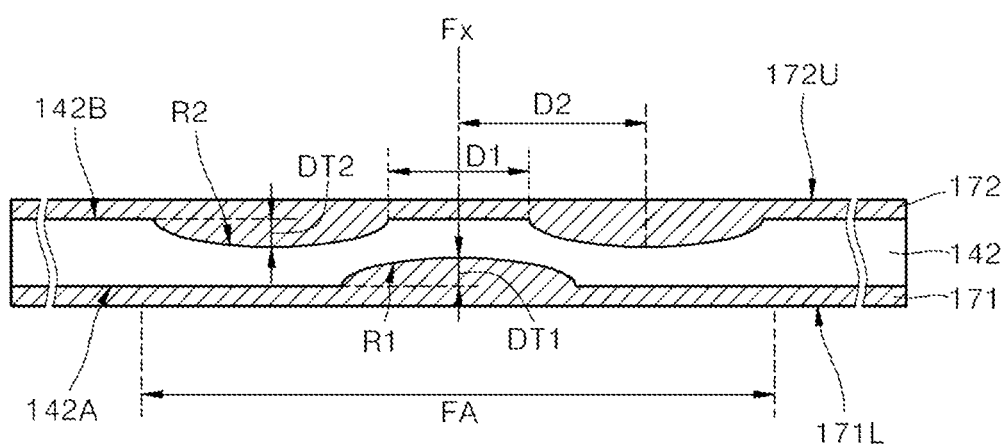
FIG. 14 and FIG. 15 are a cross-sectional view and a plan view, respectively, illustrating a protective part according to an embodiment of the present disclosure, respectively.
Figure 15:
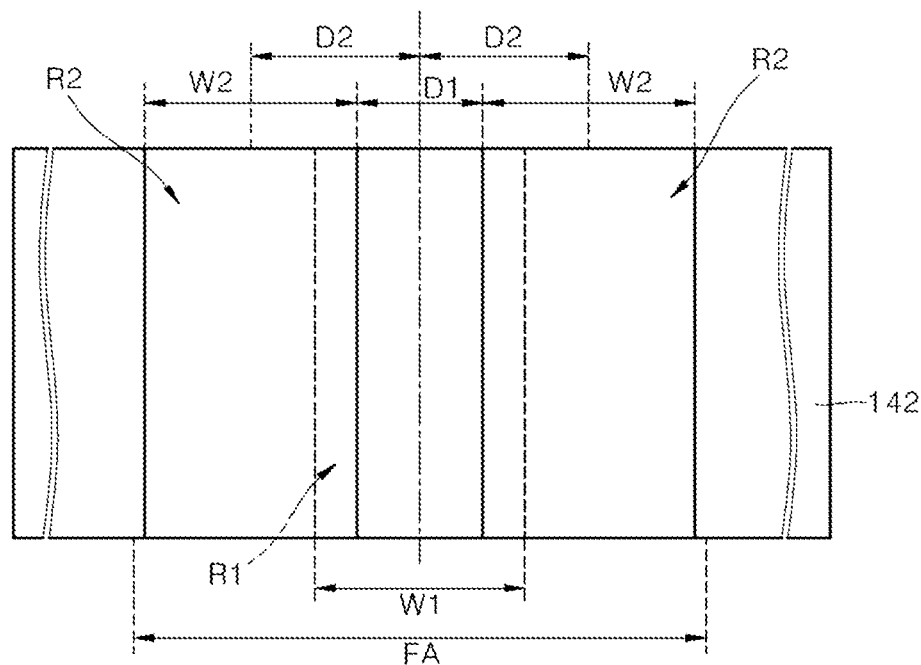

FIG. 14 and FIG. 15 are a cross-sectional view and a plan view illustrating the protective part according to an embodiment of the present disclosure, respectively.

Referring to FIG. 14 and FIG. 15, the protective part 142 may include a first recess R1 and second recesses R2 in the foldable area FA. The first recess R1 overlaps the folding axis Fx and may be disposed at the first surface 142A, for example, a lower surface of the protective part 142. At least two or more second recesses R2 spaced apart from each other and respectively disposed on both sides of the folding axis Fx may be disposed at the second surface 142B of the protective part 142, for example, an upper surface thereof.

In an embodiment, to reduce the stress applied to the protective part 142 during the folding of the apparatus, a portion of the protective part 142 overlapping the folding axis Fx may be etched away or otherwise removed from the first surface 142A to form the first recess R1. In addition, portions of the protective part 142 on both sides of the folding axis Fx and spaced from the folding axis Fx at an equal spacing (or distance) may be etched from the second surface 142B of the protective part 142 to form the recesses R2. Accordingly, a portion of the protective part 142 in the foldable area FA may be etched into a generally "W" shape with two upper recesses R2 spaced equally from the folding axis Fx and a single lower recess R1 centered on the folding axis Fx and positioned between the upper recesses R2. In some embodiments, the recesses R1, R2 are selected to have a different spacing. For example, the recesses R1, R2 may be spaced from the folding axis at a selected distance that is different for each recess R2. In addition, the first recess R1 may be offset from the folding axis Fx or spaced from the folding axis Fx. In yet a further embodiment, there is only one recess R2 and only one recess R1, with the recesses R1, R2 positioned on either side of the folding axis Fx (i.e., the folding axis Fx separates the recesses R1, R2 with one recess R1 being to the left of the axis Fx and one to the right of the axis Fx in the orientation of FIG. 14). Other configurations of the recesses R1, R2 are contemplated herein.

The first recess R1 and the second recesses R2 may be formed by wet-etching the protective part 142. For example, each of the first recess R1 and the second recesses R2 may have a concave curved surface. In an embodiment, the first recess R1 may have a shape horizontally symmetrical with respect to the folding axis Fx. For example, a center of the first recess R1 may coincide with the folding axis Fx. Shapes of both halves of the first recess R1 may be identical with each other with respect to the center of the folding axis Fx. For example, the second recesses R2 may be formed to be symmetrical with each other with respect to the folding axis Fx. The second recesses R2 may be spaced apart, by the same distance, from the folding axis Fx. In an embodiment, distances between the centers of the second recesses R2 and the folding axis Fx may be equal to each other. Moreover, shapes of the second recesses R2 may be identical with each other. Shape of both halves of the second recess R2 may be identical with each other with respect to the center of the second recess R2, or each half of each second recess R2 may mirror symmetrical with respect to the other half of the respective second recess R2.

It has been discovered that where the first recess R1 overlaps the folding axis Fx and is disposed at the lower surface 142A of the protective part 142, and a second recess R2 overlaps the folding axis Fx and is disposed at the upper surface 142B of the protective part 142 (i.e., the recesses R1, R2 are in the top and bottom surfaces 142A, 142B of the protective part 142 about the folding axis Fx), the greatest stress during the out-folding of the apparatus and the greatest stress during the in-folding of the apparatus may be concentrated on the folding axis area. Accordingly, since the stress is concentrated on one point in the protective part 142 in which the recesses are formed in a vertically symmetrical arrangement and disposed at the foldable area, the fatigue failure characteristic may be poor and cracks are likely to occur in the protective part 142 at this point. Therefore, according to an embodiment of the present disclosure, the first recess R1 is symmetrical with respect to the folding axis Fx, and the second recesses R2 are arranged in a symmetrical manner with respect to the folding axis Fx to distribute the stress across multiple points (i.e., at least to the inflection points between the recesses R1, R2) to reduce or prevent cracks in the protective part 142 and thus reduce durability defects of the apparatus.

In an embodiment, a depth DT1 of the first recess R1 and a depth DT2 of the second recesses R2 may be equal to each other. Except as otherwise indicated, 'a depth of a recess' may be a depth at a central vertical axis of the recess in the orientation shown in FIG. 14. For example, the depth may be a vertical distance from a surface 142A, 142B (an upper surface or a lower surface) of the protective part 142 to the lowest level of the recess or the point of the recess that extends furthest into the protective part 142. The protective part 142 may have, for example, an overall thickness of 30 to 200 μm (with reference to the non-foldable area thereof). In an embodiment of the present disclosure, each of the depth DT1 of the first recess R1 and the depth DT2 of the second recess R2 in the foldable area FA may be in a range of 40% or more to 85% or less of the overall thickness of the protective part 142 in the non-foldable area thereof.

A spacing (or distance) D1 between adjacent edges of the second recesses R2 may be smaller than a width W1 of the first recess R1. The second recesses R2 may be spaced apart from each other, while each of the second recesses R2 may partially overlap with the first recess R1. For example, the width W1 of the first recess R1 and a width W2 of the second recesses R2 may be equal to each other. Each of the width W1 of the first recess R1 and the width W2 of the second recesses R2 may be in a range of 1 mm or more to 2 mm (2R) or less.

The width W1 of the first recess R1 may be different from the width W2 of the second recesses R2. The depth DT1 of the first recess R1 may be different from the depth DT2 of the second recesses R2. For example, the width W1 of the first recess R1 may be larger than the width W2 of the second recesses R2. Further, for example, the depth DT1 of the first recess R1 may be larger than the depth DT2 of the second recesses R2.

In addition, it has been found that the following relationship between components of the protective part 142 may be the most effective for spreading or distributing the stress in the protective part 142: a distance D2 from the folding axis Fx of the protective part 142 to a center of the second recesses R2 is equal to or larger than a radius of curvature of the protective part 142 in an out-folded state of the apparatus, or is smaller than or equal to a sum of the radius of curvature in the out-folded state of the apparatus and ⅙ of the width W2 of the second recesses R2.

The protective part 142 includes the first recess R1 and the second recesses R2 in the foldable area FA, thereby improving the folding characteristics of the foldable area FA while maintaining the strength of the non-foldable area (i.e., the area outside the foldable area FA). In other words, the non-foldable area of the protective part 142 does not include recesses to maintain the strength and structural integrity of the non-foldable area. Further, this may reduce the stress applied to the foldable area FA of the protective part 142 during the folding of the apparatus. For example, when the in-folding and out-folding of the apparatus are repeated, the stress may be prevented from being concentrated on one point, for example, the folding axis Fx area of the protective part 142. Rather, the stress is distributed along the protective part 142, and at least to multiple points of concentration. Therefore, the fatigue failure characteristic of the protective part 142 may be improved, and thus the occurrence of cracks may be reduced.

According to an embodiment of the present disclosure, the first recess R1 is formed at the first surface 142A of the protective part 142, for example, a lower surface thereof, and the second recesses R2 are spaced apart from each other and formed at the second surface 142B of the protective part 142, for example, the upper surface thereof. The first recess R1 is symmetrical with respect to the folding axis Fx, and the second recesses R2 are symmetrically arranged with respect to the folding axis Fx. The crack of the protective part 142 may be prevented from occurring and thus the durability may be improved.

The first layer 171 may cover an entirety of the first surface 142A of the protective part 142, for example, the lower surface thereof and may fill the first recess R1. A lower surface 171L of the first layer 171 may be flat. The second layer 172 may cover an entirety of the second surface, for example, the upper surface of the protective part 142, and may fill the second recesses R2. An upper surface 172U of the second layer 172 may be flat. Since the lower surface 171L of the first layer 171 and the upper surface 172U of the second layer 172 are flat, the first and second layers 171 and 172 may be adhered or attached to other components while an empty space is not formed therebetween. In other words, the first and second layers 171, 172 may be planarizing layers that accommodate the shape of the protective part 142 and the recesses R1, R2 without impacting the overall structure of the apparatus 100-6 or otherwise requiring significant changes to the structure of the apparatus 100-6.

The durability of the protective part 142 may be enhanced by disposing the first layer and the second layer 171, 172 at the upper and/or lower surfaces 142A, 142B of the protective part 142 and in the foldable area FA. For example, when the first layer 171 and the second layer 172 are respectively formed at both surfaces 142A, 142B of the protective part 142, the strength of the foldable area FA of the protective part 142 may be reinforced. Further, even when a crack occurs in the protective part 142 or the protective part 142 is broken, scattering of glass fragments may be prevented. A refractive index of each of the first layer 171 and the second layer 172 may be substantially equal to a refractive index of the protective part 142. For example, when the refractive index of the protective part 142 is 1.52, the refractive index of each of the first layer 171 and the second layer 172 may be about 1.52. In an embodiment, a difference between the refractive index of each of the first layer 171 and the second layer 172 and the refractive index of the protective part 142 may be 0.01 or less. This arrangement is preferred to prevent the first recess R1 and the second recesses R2 from being visually recognized from an outside. However, the difference in refractive index may also be greater than 0.01 in some embodiments with other structures or layers obscuring the recesses R1, R2. Each of the first layer 171 and the second layer 172 may include a polymer material having a storage modulus lower than that of the cover window 190. Each of the first layer 171 and the second layer 172 may include a material having a storage modulus ranging from $1 \times 10^7$ to $9 \times 10^8$ Pa. Each of the first layer 171 and the second layer 172 may include, for example, a urethane-based, a silicone-based, an epoxy-based, and an acrylic-based polymers or resins. Embodiments of the present disclosure are not limited thereto.

Figure 16:
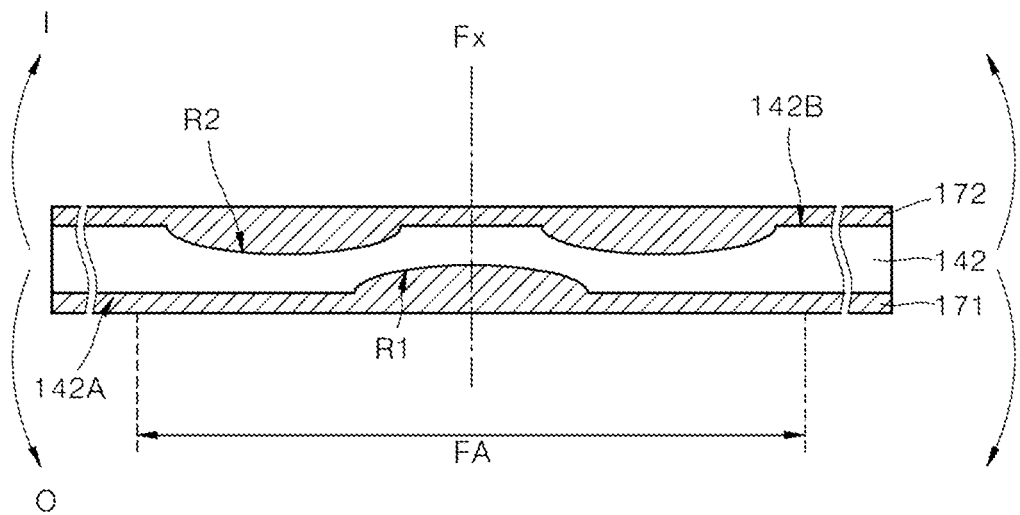
FIG. 16, drawing (a) of FIG. 17, and drawing (b) of FIG. 17 illustrate a stress simulation result of a protective part according to an embodiment of the present disclosure.
Figure 17:
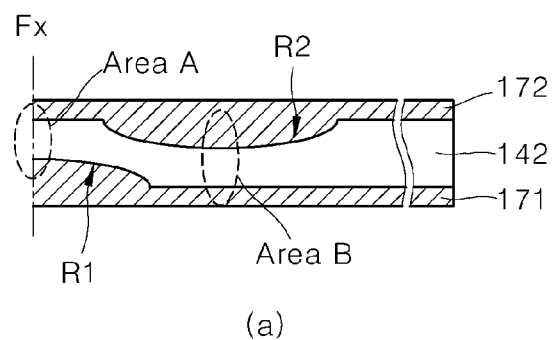
Figure 17:
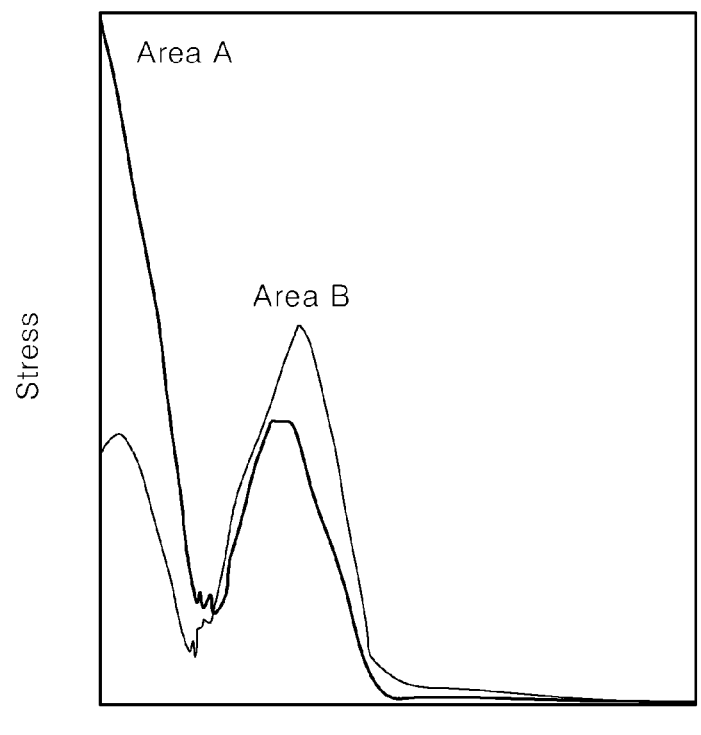

FIG. 16, drawing (a) of FIG. 17, and drawing (b) of FIG. 17 illustrate a stress simulation result of a protective part according to an embodiment of the present disclosure.

FIG. 16 illustrates in-folding and out-folding in the simulation.

Referring to FIG. 16, in the in-folding configuration I, the protective part 142 may be folded about the folding axis Fx so that halves of the second surface 142B of the protective part 142 in which the second recesses R2 are formed face each other. In the out-folding configuration O, the protective part 142 may be folded around the folding axis Fx so that halves of the first surface 142A of the protective part 142 in which the first recess R1 is formed face each other. The in-folding configuration is generally indicated by the arrows I and the out-folding configuration is generally indicated by the arrows O in FIG. 16.

Drawing (b) of FIG. 17 illustrates a stress applied to the foldable area FA of the protective part 142 during the in-folding and out-folding, based on a distance from the folding axis Fx. Since the structure of the protective part is symmetrical with respect to the folding axis, drawing (a) of FIG. 17 illustrates a half portion of the protective part 142 on one side of the folding axis Fx. Referring to drawing (a) of FIG. 17 and drawing (b) of FIG. 17, the greatest stress may be applied to an area A (folding axis area) during the in-folding of the apparatus. For example, the greatest stress may be applied to the folding central axis during the in-folding of the apparatus. During the out-folding, the greatest stress may be applied to an area B (horizontal central area of the second recess). In an embodiment, the greatest stress may be applied to the area in which the upper portion of the protective part 142 is etched (the second recess R2), during the out-folding of the apparatus. Therefore, because the area to which the greatest stress is applied during the in-folding is different from the area to which the greatest stress is applied during the out-folding, fatigue failure characteristic at the folding axis Fx may be reduced compared to an example where the greatest stress occurs at the folding axis Fx during in-folding and out-folding, such as if the protective part 142 did not include the recesses R1, R2.

According to an embodiment of the present disclosure, the area of the protective part 142 to which the greatest stress is applied during the in-folding is different from the area of the protective part 142 to which the greatest stress is applied during the out-folding. Thus, the fatigue failure characteristic of the protective part 142 may be improved and thus the occurrence of cracks may be reduced.

Foldable display apparatuses according to embodiments of the present disclosure may be described as follows.

According to an embodiment of the present disclosure, a foldable display apparatus comprises a display panel, a cover window on the display panel, and a first layer between the display panel and the cover window, the first layer having a storage modulus lower than a storage modulus of the cover window.

In some embodiments of the present disclosure, the storage modulus of the first layer may be in a range of $1 \times 10^7$ to $9 \times 10^8$ Pa.

In some embodiments of the present disclosure, the first layer may include one of a silicone-based polymer, a urethane-based polymer, an epoxy-based, and an acrylic-based polymer.

In some embodiments of the present disclosure, the first layer may include a core layer, and a protective layer surrounding side surfaces of the core layer.

In some embodiments of the present disclosure, the display panel may include a display area, a non-display area at a periphery of the display area, and a foldable area overlapping a portion of the display area and a portion of the non-display area. The protective layer may be absent at an area adjacent to the folding axis of the foldable area among the side surfaces of the core layer.

In some embodiments of the present disclosure, the display apparatus may further comprise a light-blocking layer at a periphery portion of the display panel, and the first layer may cover an upper surface, an inner side face, and a lower surface of the light-blocking layer.

In some embodiments of the present disclosure, the display apparatus may further comprise a protective part between the display panel and the cover window, and the first layer may be disposed at the protective part or adhered thereto by an adhesive layer.

In some embodiments of the present disclosure, the display panel may include a display area, a non-display area at a periphery of the display area, and a foldable area overlapping a portion of the display area and a portion of the non-display area. The protective part includes a first recess and at least two or more second recesses, the first recess overlaps a folding axis of the foldable area and disposed at a first surface of the protective part, and at the least two or more second recesses are spaced apart from each other at both sides of the folding axis and disposed at a second surface opposite to the first surface of the protective part.

In some embodiments of the present disclosure, the at least two or more second recesses may be symmetrically disposed with respect to the folding axis.

In some embodiments of the present disclosure, a spacing between adjacent edges of the at least two or more second recesses may be smaller than a width of the first recess.

In some embodiments of the present disclosure, each of the first recess and the at least two or more second recesses may have a curved surface.

In some embodiments of the present disclosure, the first layer is disposed at the first surface of the protective part, the foldable display apparatus further comprises a second layer which is disposed at second surface opposite to the first surface of the protective part, the first layer covers the first surface of the protective part, and fills the first recess, and the second layer covers the second surface of the protective part, and fills the second recesses.

In some embodiments of the present disclosure, a distance from the folding axis to a center of each of the at least two or more second recesses may be equal to or larger than a radius of curvature of the foldable display apparatus in an out-folded state or is equal to or smaller than a sum of the radius of curvature in the out-folded state and ⅙ of a width of each of the at least two or more second recesses.

According to an embodiment of the present disclosure, a foldable display apparatus comprises a display panel including a display area, a non-display area at a periphery of the display area, and a foldable area overlapping a portion of the display area and a portion of the non-display area, a cover window on the display panel, a protective part between the display panel and the cover window, a first layer at a first surface of the protective part, and a second layer at a second surface opposite to the first surface of the protective part, the first surface of the protective part includes a first recess overlapping a folding axis of the foldable area, and the second surface opposite to the first surface of the protective part includes at least two or more second recesses, the at least two or more second recesses are spaced apart from each other at both sides of the folding axis.

In some embodiments of the present disclosure, the at least two or more second recesses may be symmetrically disposed with respect to the folding axis.

In some embodiments of the present disclosure, a spacing between adjacent edges of the at least two or more second recesses may be smaller than a width of the first recess.

In some embodiments of the present disclosure, each of the first recess and the at least two or more second recesses may have a curved surface.

In some embodiments of the present disclosure, the first layer may cover the first surface of the protective part and fill the first recesses, and the second layer may cover the second surface of the protective part and fill the at least two or more second recesses.

In some embodiments of the present disclosure, each of the first layer and the second layer may have a storage modulus lower than a storage modulus of the cover window.

In some embodiments of the present disclosure, a difference between a refractive index of each of the first layer and the second layer and a refractive index of the protective part may be 0.01 or less.

According to an embodiment of the present disclosure, a foldable display apparatus comprises: a display panel; a cover window on the display panel; a protective part between the display panel and the cover window; a light-blocking layer at a periphery portion of a bottom surface of the cover window; and a first layer formed at a lower surface of the cover window to cover the light-blocking layer, wherein the first layer is located above the protective part, and the first layer has a storage modulus lower than a storage modulus of the cover window.

It will be apparent to those skilled in the art that various modifications and variations may be made in the present disclosure without departing from the technical idea or scope of the disclosure. Thus, it may be intended that embodiments of the present disclosure cover the modifications and variations of the disclosure provided they come within the scope of the appended claims and their equivalents.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A foldable display apparatus, comprising:
   a display panel;
   a cover window on the display panel; and
   a first layer between the display panel and the cover window, the first layer having an elastic storage modulus less than an elastic storage modulus of the cover window,
   wherein the display panel includes a display area, a non-display area at a periphery of the display area, and a foldable area overlapping a portion of the display area and a portion of the non-display area,
   wherein the first layer includes a core layer and a protective layer surrounding side surfaces of the core layer, and
   wherein the protective layer is absent from the side surfaces of the core layer in an area of the core layer adjacent to a folding axis of the foldable area.

2. The foldable display apparatus of claim 1, wherein the elastic storage modulus of the first layer is in a range of $1 \times 10^7$ to $9 \times 10^8$ Pa.

3. The foldable display apparatus of claim 1, wherein the first layer includes one of a silicone-based polymer, a urethane-based polymer, an epoxy-based polymer, and an acrylic-based polymer.

4. The foldable display apparatus of claim 1, further comprising:
   a light-blocking layer at a periphery portion of the display panel,
   wherein the first layer covers an upper surface, an inner surface, and a lower surface of the light-blocking layer.

5. The foldable display apparatus of claim 1, further comprising:
   a protective part between the display panel and the cover window,
   wherein the first layer is disposed on the protective part or adhered to the protective part by an adhesive layer.

6. The foldable display apparatus of claim 5,
   wherein the protective part includes a first recess overlapping a folding axis of the foldable area, the first recess disposed in a first surface of the protective part, and
   wherein the protective part includes at least two or more second recesses spaced apart from each other on opposite sides of the folding axis, the at least two or more second recesses disposed in a second surface of the protective part opposite to the first surface of the protective part.

7. The foldable display apparatus of claim 6, wherein the at least two or more second recesses are symmetrically disposed with respect to the folding axis.

8. The foldable display apparatus of claim 6, wherein a space between adjacent edges of the at least two or more second recesses is less than a width of the first recess.

9. The foldable display apparatus of claim 6, wherein the first recess and each of the at least two or more second recesses has a curved surface.

10. The foldable display apparatus of claim 6, wherein the first layer includes:

a first portion that covers the first surface of the protective part and fills the first recess of the protective part; and a second portion that covers the second surface of the protective part and fills the at least two or more second recesses of the protective part.

11. The foldable display apparatus of claim 6, wherein a distance from the folding axis to a center of each of the at least two or more second recesses on either side of the folding axis is equal to or greater than a radius of curvature of the protective part in an out-folded state of the foldable display apparatus or is equal to or less than a sum of the radius of curvature in the out-folded state and ⅙ of a width of each of the at least two or more second recesses.

12. A foldable display apparatus, comprising:
a display panel including a display area, a non-display area at a periphery of the display area, and a foldable area overlapping a portion of the display area and a portion of the non-display area;
a cover window on the display panel;
a protective part between the display panel and the cover window;
a first layer at a first surface of the protective part; and
a second layer at a second surface of the protective part opposite to the first surface of the protective part,
wherein the first surface of the protective part includes a first recess overlapping a folding axis of the foldable area of the display panel, a center of the first recess coincides with the folding axis, and the first recess has a shape that is horizontally symmetrical with respect to the folding axis, and
wherein the second surface of the protective part includes two second recesses, the second recesses spaced apart from each other on both sides of the folding axis by the same distance from the folding axis, and each of the second recesses partially overlaps with the first recess.

13. The foldable display apparatus of claim 12, wherein the second recesses are symmetrically disposed with respect to the folding axis.

14. The foldable display apparatus of claim 12, wherein a space between adjacent edges of the second recesses is less than a width of the first recess.

15. The foldable display apparatus of claim 12, wherein the first recess and each of the second recesses has a curved surface.

16. The foldable display apparatus of claim 12, wherein the first layer covers the first surface of the protective part and fills the first recess, and
wherein the second layer covers the second surface of the protective part and fills the second recesses.

17. The foldable display apparatus of claim 16, wherein the first layer and the second layer each have an elastic storage modulus lower than an elastic storage modulus of the cover window.

18. The foldable display apparatus of claim 16, wherein a difference between a refractive index of each of the first layer and the second layer and a refractive index of the protective part is 0.01 or less.

19. A foldable display apparatus, comprising:
a display panel;
a cover window on the display panel;
a protective part between the display panel and the cover window;
a light-blocking layer at a periphery portion of a bottom surface of the cover window; and
a first layer at a lower surface of the cover window that covers the light-blocking layer,
wherein the first layer is located above the protective part, and the first layer has a storage modulus lower than a storage modulus of the cover window,
wherein the display panel includes a display area, a non-display area at a periphery of the display area, and a foldable area overlapping a portion of the display area and a portion of the non-display area,
wherein the first layer includes a core layer and a protective layer surrounding side surfaces of the core layer, and
wherein the protective layer is absent from the side surfaces of the core layer in an area of the core layer adjacent to a folding axis of the foldable area.

\* \* \* \* \*